US005604083A

United States Patent [19]
Valsecchi et al.

[11] Patent Number: 5,604,083

[45] Date of Patent: Feb. 18, 1997

[54] ANTISTATIC FILM BASES AND PHOTOGRAPHIC ELEMENTS COMPRISING SAID ANTISTATIC FILM BASES

[75] Inventors: Alberto Valsecchi, Vado Ligure; Giorgio Spazzapan, Savona; Renzo Torterolo, Cairo Montenotte, all of Italy; Soonkun Kang, Lake Elmo, Mich.

[73] Assignee: Minnesota Mining and Manufacturing Company, St. Paul, Minn.

[21] Appl. No.: 568,732

[22] Filed: Dec. 5, 1995

[30] Foreign Application Priority Data

Jan. 12, 1995 [EP] European Pat. Off. ............ 95100346

[51] Int. Cl.⁶ .................................................. G03C 1/89
[52] U.S. Cl. .................. 430/528; 430/529; 428/483; 428/500; 428/522
[58] Field of Search .................................. 430/528, 529; 428/500, 522, 483

[56] References Cited

U.S. PATENT DOCUMENTS

| | | | |
|---|---|---|---|
| 4,225,665 | 9/1980 | Schadt, III | 430/529 |
| 4,585,730 | 4/1986 | Cho | 430/527 |
| 4,701,403 | 10/1987 | Miller | 430/529 |
| 5,294,662 | 3/1994 | Moore et al. | 524/516 |
| 5,300,602 | 4/1994 | Arita et al. | 526/260 |

FOREIGN PATENT DOCUMENTS

| | | |
|---|---|---|
| 0176609A1 | 4/1986 | European Pat. Off. . |
| 0486982A1 | 5/1992 | European Pat. Off. . |
| 0570013A1 | 11/1993 | European Pat. Off. . |
| 0576910A1 | 1/1994 | European Pat. Off. . |
| 0589329A1 | 3/1994 | European Pat. Off. . |
| 0631178A1 | 12/1994 | European Pat. Off. . |
| 2282125 | 8/1974 | France . |
| 5295275A | 11/1993 | Japan . |
| 1194195 | 9/1967 | United Kingdom . |

*Primary Examiner*—Richard L. Schilling
*Attorney, Agent, or Firm*—Gary L. Griswold; Walter N. Kirn; Mark A. Litman

[57] ABSTRACT

The invention is directed to an antistatic polymeric film base comprising a polymeric film having coated on at least one side thereof an antistatic layer comprising the reaction product of (1) a water-soluble, electrically conductive polymer containing carboxylic groups and (2) a water-soluble polymer containing oxazoline groups, and to a photographic element comprising at least one silver halide emulsion layer on said antistatic polymeric film base. This antistatic layer may be present as a backing layer on the side of the film base opposite the silver halide emulsion layer, as a subbing layer between the film base and the emulsion layer in a single or double side coated photographic element, and/or as a subbing layer between the film base and a different backing layer.

10 Claims, No Drawings

ANTISTATIC FILM BASES AND PHOTOGRAPHIC ELEMENTS COMPRISING SAID ANTISTATIC FILM BASES

FIELD OF THE INVENTION

The present invention relates to photographic film bases which are provided with antistatic layer(s), and to light-sensitive photographic elements comprising said film bases.

BACKGROUND OF THE ART

The use of polymeric film bases to carry photographic layers is well known. In particular, photographic elements which require accurate physical characteristics use polyester film bases, such as polyethylene terephthalate and polyethylene naphthalate film bases. In fact, polyester film bases, when compared with commonly used cellulose ester film bases, are dimensionally more stable and more resistant to mechanical stresses under most conditions of use.

The formation of static electric charges on film bases is a serious problem in the production and use of photographic elements. While coating the light-sensitive photographic emulsion, electric charges accumulate on the base discharge, producing light which may be recorded as an image on the light-sensitive layer. Other drawbacks which result from the accumulation of electric charges on polymeric film bases are the adherence of dust and dirt, and the creation of coating defects.

Additionally, photographic elements comprising light-sensitive layers coated onto polymeric film bases, when used in rolls or reels which are mechanically wound and unwound or in sheets which are conveyed at high speed, tend to accumulate static charges and record the light generated by static discharges.

The static-related damages may occur not only before the photographic element has been manufactured, exposed and processed, but also after processing when the photographic element including the image is used with other photosensitive media to reproduce or enlarge the image. Accordingly, it is desired to provide permanent antistatic protection, that is antistatic protection which retains its effectiveness even after photographic processing.

Several techniques have been suggested to protect photographic elements from the adverse effects of static charges.

Matting agents, hygroscopic materials or electroconductive polymers have been proposed to prevent static buildup, each acting with a different mechanism. However, matting agents cause haze, dust and dirt problems; hygroscopic materials cause sheets or films to stick together or to other surfaces; and electroconductive polymers are not permanent after photographic processing or may not be transparent when coated with conventional binders.

U.S. Pat. No. 4,225,665 purports to disclose permanent antistatic layers for photographic elements. These layers consist essentially of three components: (1) a water-soluble, electrically conductive polymer comprising carboxylic groups, (2) a hydrophobic polymeric binder containing carboxylic groups, and (3) a polyfunctional aziridine crosslinking agent. This composition, however, tends to give hazy coatings and allows premature reactions among the components prior to coating. U.S. Pat. No. 4,701,403 suggests a costly system of coating the components as two separate coatings to avoid these premature reactions.

U.S. Pat. No. 4,585,730 discloses a photographic element comprising a film base, a silver halide emulsion on one side of the support, and an antistatic layer on the other side of said support, wherein the antistatic layer is coated with an auxiliary gelatin layer containing a conductive polymer, whereby the antistatic properties of the antistatic layer are conducted through said auxiliary layer. Reference is made to U.S. Pat. No. 4,225,665 and 4,701,403 as useful antistatic layers to be coated with the auxiliary layer according to U.S. Pat. No. 4,585,730. This two layer construction, however, often suffers from poor adhesion between the two layers during photographic processing.

An antistatic layer coated onto a polymeric film base has been described in EP 486,982 and EP 589,329. That antistatic layer comprises the reaction product of a copolymer of sodium polystyrene sulfonate and maleic acid with a polyfunctional epoxide crosslinking agent. This antistatic layer provides good adhesion of photographic gelatin layers coated over it, even during photographic processing. A problem with this antistatic layer relates to its low crosslinking rate, which requires both drying and curing at high temperature to obtain a water resistant permanent antistatic layer.

Arita et al. in U.S. Pat. No. 5,300,602 describe a water soluble polymer containing oxazoline groups useful as crosslinking agent for aqueous resins. The use of this polymer in antistatic composition to be coated on a photographic support base is neither disclosed nor suggested.

SUMMARY OF THE INVENTION

In one embodiment, the invention comprises a polymeric film base at least one side of which is coated with an antistatic layer comprising the reaction product of (1) a water-soluble, electrically conductive polymer containing carboxylic groups and (2) a water-soluble polymer containing oxazoline groups.

In a specific embodiment, the invention comprises a photographic element comprising a polymeric film base, a silver halide emulsion layer on said film base, and an antistatic layer which comprises the reaction product of (1) a water-soluble, electrically conductive polymer containing carboxylic groups and (2) a water-soluble polymer containing oxazoline groups. This antistatic layer may be present in essentially any location on the element, including a backing layer on the side of the film base opposite the silver halide emulsion layer, a subbing layer between the film base and the emulsion layer in a single or double side coated photographic element, and/or a subbing layer between the film base and a different backing layer.

DETAILED DESCRIPTION OF THE INVENTION

The present invention comprises an antistatic film base particularly useful for imaging media, especially silver halide photographic media. The film base comprises a polymeric substrate such as a polyester, and especially polyethylene terephthalate or polyethylene naphthalate. Other useful polymeric substrates include cellulose acetates, polyolefins, polycarbonates and the like. The film base has an antistatic layer adhered to one or both major surfaces of the base. A primer layer or subbing layer may be used between the base itself and the antistatic layer, as known in the art. Priming and subbing layers are, in fact, generally considered to be part of the base itself unless specifically excluded in the description (e.g., unsubbed polyester).

Primer and subbing compositions are well known in the art and polymers of vinylidene chloride often comprise the primer composition of choice for photographic elements.

The antistatic layer of the present invention comprises the reaction product of (1) a water-soluble electrically conductive polymer having carboxylic groups and (2) a water-soluble polymer containing oxazoline groups.

The component (1) of the antistatic layer of the present invention is preferably a water-soluble (e.g., soluble in water at room temperature at a concentration of at least 5%, preferably as at least 10% by weight of water) electrically conductive hydrophilic copolymer having monomer units comprising, for example, (a) a —SO$_3$M substituted ethylenically unsaturated monomer where M is H$^+$, NH$_4^+$, metal cation or N(R)$_4^+$ where R is an alkyl group having 1–4 carbon atoms, and (b) an ethylenically unsaturated comonomer containing carboxylic groups, the molar ratio of (a) to (b) preferably being 1:1 to 5:1, and optionally (c) another ethylenically unsaturated monomer containing no free carboxylic groups.

The component (2) of the antistatic layer of the present invention is preferably a water-soluble (e.g., soluble in water at room temperature at a concentration of at least 5%, preferably as at least 10% by weight of water) hydrophilic copolymer having monomer units comprising:

(a') a 2-oxazoline substituted ethylenically unsaturated monomer, and (b') an acrylic and methacrylic derivative comonomer, and optionally (c') at least a third ethylenically unsaturated comonomer.

In component (1), the amount of units derived frown electrically conductive monomers (a) serves to balance the requirements for antistatic protection with sufficient capability of the-copolymer to become crosslinked through the carboxylic groups of units derived from monomers (b). For example, monomer (a) may be styrene sulfonic acid, vinyltoluene sulfonic acid, α-methyl-styrene sulfonic acid, 2-ethyl-styrene sulfonic acid, 3-acryloyloxypropane-1-sulfonic acid, 3-methacryloyloxypropane-1-sulfonic acid, 2-acrylamido-2-methylpropane-sulfonic acid, 3-methacryloyloxypropane-1-methyl- 1-sulfonic acid, acryloyl-methane-sulfonic acid, 4-acryloyloxybutane-1-sulfonic acid, 4-acryloyloxybutane-1-sulfonic acid, 2-acryloyloxyethane-1-sulfonic acid, 2-acrylamidopropane-1-sulfonic acid, 2-methacrylamido-2-methylpropane-1-sulfonic acid, 3-methacrylamido-3-methylbutane-1-sulfonic acid or alkali metal salts thereof, preferably Na or K, or ammonium salts. Monomer (b) may be maleic acid, acrylic acid, methacrylic acid, 2-butenoic acid. Monomer (c), if present, is to be chosen to not negatively affect the electrical conductivity, water solubility and crosslinking capability of the polymers according to the present invention. Examples of monomers (c) are ethylenic monomers (such as isoprene, 1,3-butadiene, vinyl chloride, ethylene, propylene), styrene type monomers (such as styrene, vinyltoluene, α-methyl-styrene, 2-ethyl-styrene, 1-vinylnaphthalene), 2-alkenoic acid esters (e.g., methyl, ethyl, propyl, butyl, and hexyl esters of acrylic, methacrylic, α-ethylacrylic, α-propylacrylic, 2-butenoic acids), acrylamide monomers (such as acrylamide, N-methylacrylamide, N,N-dimethylacrylamide, N-butylacrylamide, N-chloromethyl-acrylamide) and vinyl acetate.

More preferably, the component (1) is a copolymer of a styrene sulfonate and an ethylenically unsaturated comonomer containing carboxylic groups. Most preferably, the component (1) is a copolymer of sodium styrene sulfonate and maleic acid in a 2:1 to 4:1 mole ratio (respectively) having a weight average molecular weight of from 5,000 to 50,000. The molecular weight refers to the weight average molecular weight (M$_w$), as determined by GPC (Gel Permeation Chromatography) measurements.

Examples of component (1) are poly(sodium styrene sulfonate-maleic acid), poly(sodium styrene sulfonate-methacrylic acid), poly(sodium styrene sulfonate-butyl acrylate-methacrylic acid), poly(sodium-2-acryl-amido-2-methylpropanesulfonate-maleic acid) and the like. These components (1) may be purchased commercially or synthesized by copolymerizing the monomers as known in the art.

In component (2), monomer (a') may be, for example, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline. One monomer or a mixture of two or more different monomers can be used. The preferred monomer is 2-isopropenyl-2-oxazoline due to its industrial availability. Comonomer (b') is not particularly limited within the defined class provided that it has no group which reacts with the 2-oxazoline group and (b') is capable of copolymerizing with monomer (a'). Specific examples of monomer (b') are acrylic acid, methylacrylate, ethylacrylate, butylacrylate, methacrylic acid, methylmethacrylate, and the like. Esters of acrylic acid with polyvalent alcohols or phenols are particularly useful to increase the water solubility of the resulting copolymer. Examples of such esters are methoxypolyethylene glycol acrylate, 2-hydroxyethylacrylate, monoesters of polyethylene glycol and acrylic acid. Monomer (c'), if present, is to be chosen to not negatively affect the electrical conductivity, water solubility and crosslinking capability of the polymers according to the present invention. Examples of monomers (c') are ethylenic monomers (such as isoprene, 1,3-butadiene, vinyl chloride, ethylene, propylene), styrene type monomers (such as styrene, vinyltoluene, α-methylstyrene, 2-ethyl-styrene, 1-vinylnaphthalene), 2-alkenoic acid esters (e.g., methyl, ethyl, propyl, butyl, and hexyl esters of acrylic, methacrylic, α-ethylacrylic, α-propylacrylic, 2-butenoic acids), acrylamide monomers (such as acrylamide, N-methylacrylamide, N,N-dimethylacrylamide, N-butylacrylamide, N-chloromethylacrylamide) and vinyl acetate.

Examples of component (2) are poly(2-isopropenyl-2-oxazoline-ethylacrylate), poly(2-isopropenyl-2-oxazoline-ethylacrylate-methacrylic acid), poly(2-isopropenyl-2-oxazoline-ethylacrylate), poly(2-isopropenyl-2-oxazoline-ethylacrylate-methylmethacrylate) and the like. More preferably, the component (2) is a copolymer of a 2-alkylene-2-oxazoline and an acrylic or methacrylic ester. Most preferably, the component (2) is a copolymer of 2-alkylene-2-oxazoline, ethylacrylate and methylmethacrylate. These components (2) may be purchased commercially or synthetized by copolymerizing the monomers as known in the art. A specific description of component (2) can be found in Arita et al. U.S. Pat. No. 5,300,602.

Prior to being coated on the polymeric base, components (1) and (2) are dissolved in an aqueous solution. The weight ratio of components (1) and (2) in the aqueous composition ranges frown 50:1 to 1:10, preferably from 30:1 to 1:1, more preferably frown 10:1 to 2:1. The aqueous coating composition including components (1) and (2) may be coated onto any suitable polymeric photographic base, but the preferred base is polyethyleneterephthalate or polyethylene naphthalenate film which has been subbed with a layer of resin, or layers of resin and gelatin. The antistatic coating is usually provided in coating weights based on the final dry weight of frown 0.01 g/m² to 1 g/m². Lower coating weights usually provide less adequate antistatic protection and higher coating weights usually give less transparent layers. The coating may be performed by conventional coating techniques, such as, for example, air knife coating, gravure coating, and doctor roller coating. The antistatic layer of the present invention may also contain other addenda which do not adversely influence the antistatic properties of the combination of components (1) and (2), such as, for example, matting agents, plasticizers, lubricants, surfactants, dyes, and haze reducing agents. The presence of binders is not required, but limited amounts (such as, for example, less than 20%, preferably less than 10% in weight based on the weight of component (1)), of binders, such as gelatin, may be added to the coating composition comprising components (1) and (2) to improve coating quality of the antistatic layer.

The reaction of (1) and (2) is effected by coating and drying of components (1) and (2) onto the polymeric substrate. Heating may be used to accelerate drying and/or the reaction of the components (curing) to form a permanent antistatic layer. Air temperatures of from 20° to 200° C. are useful for the drying-curing step, while the preferred range is 50° to 160° C. The most preferred range is 50° to 80° C. Catalysts may also be used to speed up the reaction.

The reaction product of (1) and (2) is a crosslinked product, having three-dimensional bonding within the layer. The crosslinking helps provide a permanent antistatic layer which is water-resistant and keep low molecular weight materials within the component (1) from migrating out of the antistatic layer. Migration is reduced or eliminated into other photographic layers and/or into aqueous processing solutions by the tightening effect of the crosslinking on the internal structure of the antistatic layer.

The imaging elements useful in file present invention may be any of the well-known elements for imaging in the field of graphic arts, printing, medical and information systems. Silver halide, photothermographic, photopolymer, diazo, and vesicular image-forming systems may be used, with silver halide systems being preferred.

Typical imaging element constructions of the present invention comprise:

1. Film base with an antistatic layer on one surface and the photosensitive layer or layers, preferably photographic silver halide emulsion layer or layers, on the other surface of the film base. In this construction, an auxiliary layer may or may not be present over the antistatic layer. Examples of auxiliary layers include backing gelatin protective layers and backing gelatin antihalation layers.
2. Film base with an antistatic layer on one surface and at least one photosensitive layer adhered to the same surface as the antistatic layer, over the antistatic layer.
3. Film base may have antistatic layers on both surfaces of the polymeric base and have at least one photosensitive layer on one or both sides of the film base, over said antistatic layers.

Examples of silver halide photographic elements applicable to this invention include black-and-white and color photographic elements.

The silver halide employed in this invention may be any of silver chloride, silver bromide, silver iodide, silver chlorobromide, silver chloroiodide, silver bromoiodide and silver chloroiodobromide.

The silver halide grains in the photographic emulsion may be regular grains having a regular crystal structure such as cube, octahedron, and tetradecahedron, with or without epitaxial growths, or the spherical or irregular crystal structure, or those having crystal defects such as twin plane, or those having a tabular form, or combinations and mixtures thereof.

As the binder or protective colloid for use in the photographic element, gelatin is advantageously used, but other hydrophilic colloids may be used such as gelatin substitutes, collodion, gum arabic, cellulose ester derivatives such as alkyl esters of carboxylated cellulose, hydroxy ethyl cellulose, carboxy methyl cellulose, synthetic resins, such as the amphoteric copolymers described in U.S. Pat. No. 2,949,442, polyvinyl alcohol, and others well known in the art.

The photographic elements utilizing the antistatic layer of this invention have radiation-sensitive silver halide emulsion layers, i.e., silver halide emulsions sensitive to the visible or infrared light. The silver halide emulsions may be optically sensitized by any of the spectral sensitizers commonly used to produce the desired sensitometric characteristics.

Methods for making such elements, means for sensitizing them to radiation, use of additives such as chemical sensitizers, antifoggant and stabilizers, desensitizers, brightening agents, couplers, hardening agents, coating aids, plasticizers, lubricants, matting agents, high-boiling organic solvents, development accelerating compounds, antistatic agents, antistain agents, and the like are described for example, in Research Disclosure Vol. 176, No. 17643, December 1979, Sections I to XIV.

The following examples, which further illustrate the invention, report some experimental data obtained from processes and measurements which are of normal use in the art. Surface resistivity measurements were made using the following procedure: samples of each film were kept in a cell at 21° C. and 25% R.H. for 24 hours and the electrical resistivity was measured by means of a Hewlett-Packard High Resistance Meter model 4329A. The following examples also report four adhesion values: the first is the dry adhesion value and refers to the adhesion of the silver halide emulsion layers and of the auxiliary gelatin layers to the antistatic base prior to the photographic processing; the second and the third adhesion values are the wet adhesion values and refer to the adhesion of the above layers to the antistatic base during the photographic processing (developer and fixer); the fourth adhesion value is the dry adhesion value and refers to the adhesion of the above layers to the antistatic base after photographic processing. In particular, the dry adhesion was measured by tearing samples of the film, applying a 3M Scotch™ brand 5959 Pressure Sensitive Tape along the tear line of the film and rapidly separating the tape from the film; the layer adhesion was evaluated according to a scholastic method giving a value of 2 when the whole layer was removed from the base and a value of 10 when no part thereof was removed from the base and intermediate values for intermediate situations. The wet adhesion was measured by drawing some lines with a pencil point to form an asterisk on the film just taken out from the processing bath and by rubbing on the lines with a finger. Also in this case, the adhesion of the layers was evaluated according to a scholastic method by giving a value of 2 when the layers were totally removed from the base, a value of 10 when no portion thereof was removed and intermediate values for intermediate cases.

EXAMPLE 1

The following subbing compositions were prepared and coated onto a poly(ethylene terephthalate) blue film base (PET) resin-subbed with poly(vinylidene chloride-ethylacrylate-itaconic acid) on both sides by the double roller coating technique and subsequent vertical drying for 5 minutes at 60° C. The amounts of the components reported in the following Table 1 are expressed in grams.

TABLE 1

| | Subbing Compositions | | | |
|---|---|---|---|---|
| Components | 1 (Inv.) | 2 (Inv.) | 3 (Comp.) | 4 (Comp.) |
| SSMA | 21 | 24.5 | 24.5 | 24.5 |
| IPO | 7 | 3.5 | — | — |
| EGDGE | — | — | 3.5 | — |
| FC-127 ™ | 0.01 | 0.01 | 0.01 | — |
| AZIRIDINE | — | — | — | 3.5 |
| WATER | 972 | 972 | 972 | 972 |
| SURFACE ELECTRICAL RESISTIVITY AT 25% RH | $3 \times 10^9$ | $2 \times 10^9$ | $2 \times 10^{10}$ | $5 \times 10^9$ |

SSMA = sodium styrenesulphonate maleic acid (3:1 mole ratio) copolymer ($M_w$ = 16,700)
IPO = 2-isopropenyl-2-oxazoline-ethylacrylate-methylmethacrylate terpolymer
EGDGE = ethyleneglycol-diglycidylether copolymer 50% by weight
FC-127 ™ = trade name of a fluorosurfactant of 3M Company
AZIRIDINE = pentaerythritol-tri-{β-(N-aziridinyl)propionate}

EXAMPLE 2

A tabular grain silver bromide emulsion (having an average diameter:thickness ratio of about 6.5:1) optically sensitized to green light with a cyanine dye and chemically sensitized with sodium p-toluenethiosulfonate, sodium p-toluenesulfinate and benzothiazoleiodoethylate was coated on both side of the film bases 1 to 4 of Example 1 at a silver coverage of 2.2 g/m² and gelatin coverage of 1.6 g/m² per side. A non-deionized gelatin protective supercoat containing 1.1 g/m² of gelatin per side was applied on each coating (films A to D). The films A to D in the form of sheets were exposed to X-rays exposure at 75 Kv using a pair of T8 3M Trimax™ screens and processed in a 3M Trimatic™ XP515 automatic processor, by developing for 27 seconds at 35° C., then fixing for 27 seconds at 30° C. with a hardener free fixing solution, and washing with water for 22 seconds at 35° C. and drying for 22 seconds at 35° C. The antistatic properties and the adhesion evaluation of films A to D are summarized in the following Table 2. The ready-to-use developing and fixing bath compositions used in processing the above mentioned films are described in the following tables 3 and 4.

TABLE 2

| | Films | | | |
|---|---|---|---|---|
| Tests | A (Inv.) | B (Inv.) | C (Comp.) | D (Comp.) |
| Surface resistivity Ohm/cm² at 25% RH | $7 \times 10^{10}$ | $7 \times 10^{11}$ | $2 \times 10^{11}$ | $1 \times 10^{11}$ |
| Dry adhesion before processing | 10 | 10 | 10 | 10 |
| Wet adhesion after developing | 10 | 10 | 4 | 4 |
| Wet adhesion after fixing | 10 | 10 | 4 | 4 |
| Dry adhesion after processing | 10 | 10 | 10 | 10 |

TABLE 3

| DEVELOPER | | |
|---|---|---|
| Water | g | 700 |
| $Na_2S_2O_5$ | g | 40 |
| KOH 35% (w/w) | g | 107 |
| $K_2CO_3$ | g | 13.25 |
| $CH_3COOH$ | g | 7.5 |
| Ethyleneglycol | g | 10 |
| Diethyleneglycol | g | 5 |
| EDTA.4Na | g | 1.5 |
| BUDEX ™ 5103.2Na 40% (w/w) | g | 7.5 |
| Boric acid | g | 1.7 |
| 5-methyl-benzotriazole | g | 0.08 |
| 5-nitro-indazole | g | 0.107 |
| Hydroquinone | g | 20 |
| Phenidone | g | 1.45 |
| Sodium bromide | g | 5 |
| Water to make | l | 1 |
| pH at 20° C. | | 10.35 |

TABLE 4

| FIXER | | |
|---|---|---|
| $(NH_4)_2S_2O_3$ 60% (w/w) | g | 242 |
| $Na_2SO_3$ | g | 8.12 |
| $NH_4OH$ 25% (w/w) | g | 15 |
| $CH_3COOH$ | g | 20 |
| KI | g | 0.05 |
| Water to make | l | 1 |
| pH at 20° C. | | 5.0/5.2 |

EXAMPLE 3

The stone films A to D of example 2 were conditioned at different temperature for a different period of time to evaluate their stability on aging. After conditioning the four films were exposed and developed as described in example 2. The following Table 5 summarize the results in terms of fog (Dmin).

TABLE 5

| | Films | | | |
|---|---|---|---|---|
| Ageing conditions | A (Inv.) | B (Inv.) | C (Comp.) | D (Comp.) |
| 3 Days 38° C. | 0.21 | 0.21 | 0.21 | 0.08 |
| 5 Days 50° C. | 0.23 | 0.23 | 0.23 | — |
| 160 min 70° C. | 0.20 | 0.21 | 0.50 | 0.54 |
| 160 min 90° C. | 0.23 | 0.23 | 0.29 | — |

The data of Table 5 show the improved stability of films A and B of the present invention, in particular under highly stressed ageing conditions.

We claim:
1. An antistatic film base comprising a polymeric film base having coated on at least one side thereof an antistatic layer, characterized in that said antistatic layer comprises the reaction product of (1) a water-soluble, electrically conductive polymer from ethylenically unsaturated monomers containing carboxylic groups and (2) a water-soluble polymer from ethylenically unsaturated monomers containing oxazoline groups, wherein said polymer (1) comprises:

(a) a —$SO_3M$ substituted ethylenically unsaturated monomer, wherein M is $H^+$, $NH_4^+$, metal cation or $N(R)_4^+$, wherein R is an alkyl group having 1–4 carbon atoms, and (b) an ethylenically unsaturated comonomer containing carboxylic groups, the molar ratio of (a) to (b) being 1:1 to 5:1, and optionally (c) another ethylenically unsaturated monomer containing no free carboxylic groups.

2. The antistatic film base of claim 1 wherein said —$SO_3M$ substituted ethylenically unsaturated monomers are selected from the group consisting of styrene sulfonic acid, vinyltoluene sulfonic acid, a-methyl-styrene sulfonic acid, 2-ethyl-styrene sulfonic acid, 3-acryloyloxypropane-1-sulfonic acid, 3-methacryloyloxypropane-1-sulfonic acid, 2-acrylamido-2-methylpropane-sulfonic acid, 3-methacryloyloxypropane-1-methyl-1-sulfonic acid, acryloylmethanesulfonic acid, 4-acryloyloxybutane-1-sulfonic acid, 4-acryloyloxybutane-1-sulfonic acid, 2-acryloyloxyethane-1-sulfonic acid, 2-acrylamidopropane-1-sulfonic acid, 2-methacrylamido-2-methylpropane-1-sulfonic acid, 3-methacrylamido-3-methylbutane-1-sulfonic acid, and alkali metal salts thereof.

3. A photographic film comprising a silver halide emulsion layer coated on at least one side of a polymeric film base, said polymeric film base having coated on at least one side thereof an antistatic layer, characterized in that said antistatic layer comprises the reaction product of (1) a water-soluble, electrically conductive polymer from ethylenically unsaturated monomers containing carboxylic groups and (2) a water-soluble polymer from ethylenically unsaturated monomers containing oxazoline groups, wherein said polymer (1) comprises:

(a) a —$SO_3M$ substituted ethylenically unsaturated monomer, wherein M is $H^+$, $NH_4^+$, metal cation or $N(R)_4^+$, wherein R is an alkyl group having 1–4 carbon atoms, and (b) an ethylenically unsaturated comonomer containing carboxylic groups, the molar ratio of (a) to (b) being 1:1 to 5:1, and optionally (c) another ethylenically unsaturated monomer containing no free carboxylic groups.

4. The photographic film according to claim 3, wherein said polymer (2) comprises:

(a') a 2-oxazoline substituted ethylenically unsaturated monomer, and (b') an acrylic and methacrylic comonomer, and optionally (c') an ethylenically unsaturated comonomer.

5. The photographic element of claim 3 wherein the antistatic layer has a coating weight of 0.01 $g/m^2$ to 1 $g/m^2$.

6. The photographic element of claim 3 wherein the weight ratio of components (1) and (2) ranges from 50:1 to 1:1.

7. The photographic film of claim 3 wherein said —$SO_3M$ substituted ethylenically unsaturated monomers are selected from the group consisting of styrene sulfonic acid, vinyltoluene sulfonic acid, a-methyl-styrene sulfonic acid, 2-ethyl-styrene sulfonic acid, 3-acryloyloxypropane-1-sulfonic acid, 3-methacryloyloxypropane-1-sulfonic acid, 2-acrylamido-2-methylpropanesulfonic acid, 3-methacryloyloxypropane-1-methyl-1-sulfonic acid, acryloylmethanesulfonic acid, 4-acryloyloxybutane-1-sulfonic acid, 4-acryloyloxybutane-1-sulfonic acid, 2-acryloyloxyethane-1-sulfonic acid, 2-acrylamidopropane-1-sulfonic acid, 2-methacrylamido-2-methylpropane-1-sulfonic acid, 3-methacrylamido-3-methylbutane-1-sulfonic acid, and alkali metal salts thereof.

8. The photographic film of claim 3 wherein said electrically conductive polymer comprises a copolymer of maleic acid, acrylic acid, methacrylic acid, or 2-butenoic acid.

9. The photographic film of claim 7 wherein said water-soluble copolymer containing oxazoline groups comprises a copolymer of an oxazoline group containing monomer selected from the group consisting of 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-methyl-2-oxazoline.

10. The photographic film of claim 7 wherein said electrically conductive polymer comprises a copolymer of maleic acid, acrylic acid, methacrylic acid, or 2-butenoic acid.

\* \* \* \* \*

UNITED STATES PATENT AND TRADEMARK OFFICE
CERTIFICATE OF CORRECTION

PATENT NO.: 5,604,083

DATED: February 18, 1997

INVENTOR(S): Valsecchi et al.

It is certified that error appears in the above-identified patent and that said Letters Patent is hereby corrected as shown below:

On the title page, under "Inventors:", "Soonkun Kang, Lake Elmo, Mich." should be --Soonkun Kang, Lake Elmo, Minn.--.

Col. 3, line 34, "frown" should be --from--.

Col. 5, line 2, "frown" should be --from--.

Col. 5, line 34, "file" should be --the--.

Col. 8, line 34, "stone" should be --same--.

Signed and Sealed this

Fourth Day of November, 1997

*Attest:*

BRUCE LEHMAN

*Attesting Officer*   *Commissioner of Patents and Trademarks*